W. O. AMSLER.
MEANS FOR PREPARING AND CONVEYING PULVERULENT MATERIAL.
APPLICATION FILED APR. 3, 1916.
1,364,603. Patented Jan. 4, 1921.
2 SHEETS—SHEET 1.
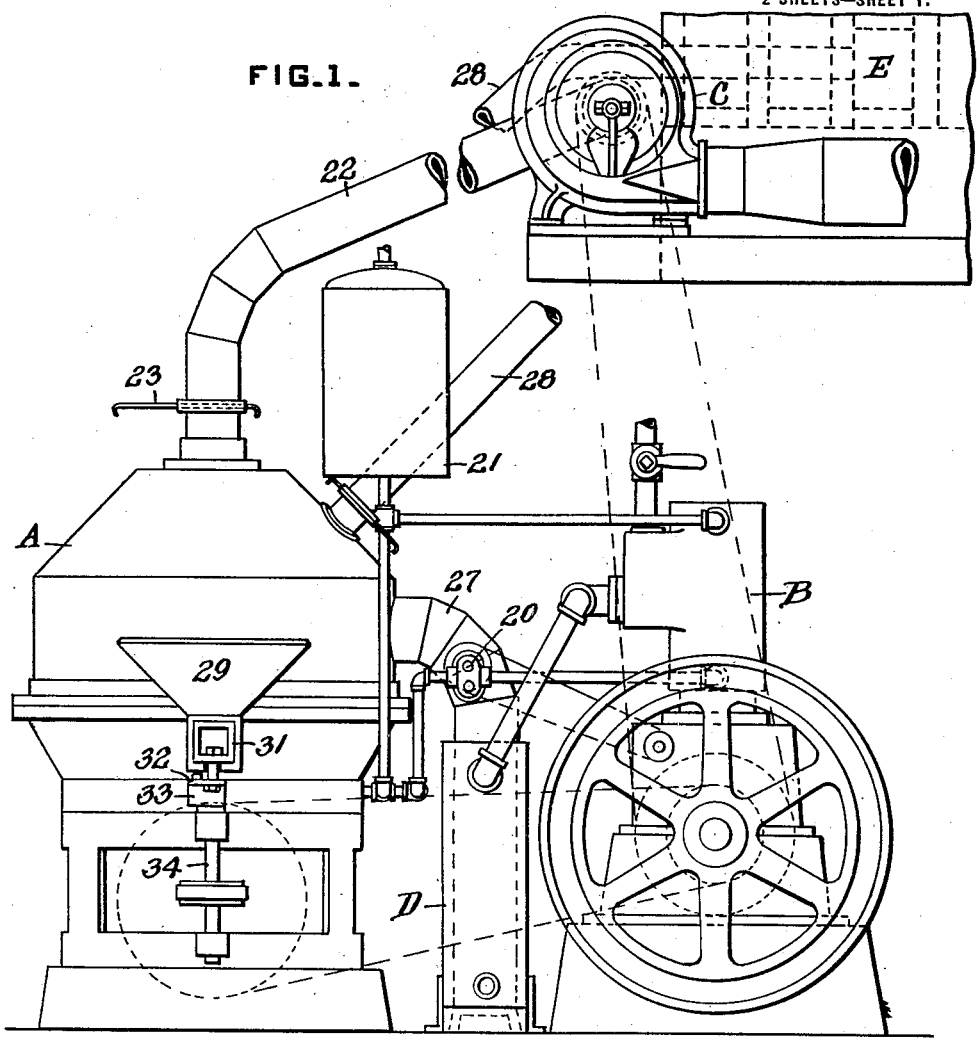
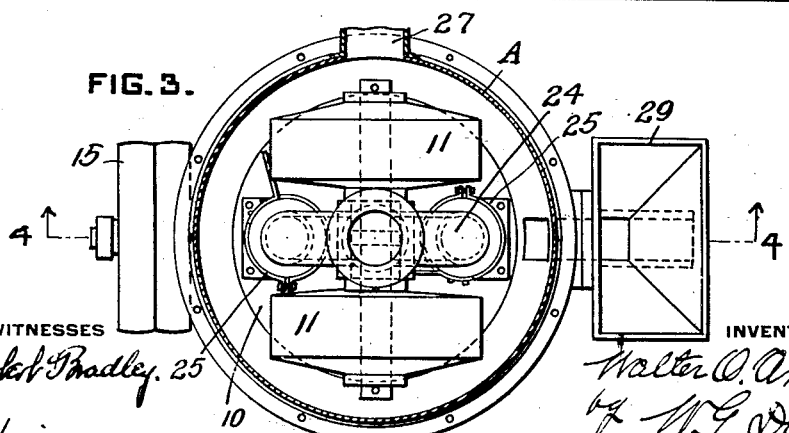

W. O. AMSLER.
MEANS FOR PREPARING AND CONVEYING PULVERULENT MATERIAL.
APPLICATION FILED APR. 3, 1916.

1,364,603.

Patented Jan. 4, 1921.
2 SHEETS—SHEET 2.

WITNESSES

INVENTOR

Patented Feb. 1, 1938

2,106,965

UNITED STATES PATENT OFFICE 2,106,965

SCREW DOWN MOTOR CONTROLLER

David C. Wright and Harry L. Wilcox, Cleveland, Ohio, assignors to the Electric Controller & Manufacturing Company, Cleveland, Ohio, a corporation of Ohio Application December 21, 1933, Serial No. 703,424

36 Claims. (Cl. 172—239)

This invention relates to a means for and method of automatically controlling the operation of a screw down motor in connection with the operation of rolling mills.

In the operation of rolling mills it is necessary to vary the spacing of the rolls in working a bloom or ingot down to a desired shape and size. In so doing the bloom or ingot is passed between the rolls at least once for each spacing. Between each of these passes the separation of the rolls is varied. This is at present done by the operation of what is known as a screw down motor, usually controlled with a hand or semi-automatically operated controller. This invention has for its main purpose the provision of means for fully controlling the spacing of the rolls automatically.

It is therefore a general object of this invention to provide means for presetting a predetermined schedule of roll spacings and for thereafter effecting the spacings automatically in response to an initiating means.

Another object is to provide a control mechanism which, after the rolls are caused to assume a definite spacing, automatically resets or conditions itself for a subsequent spacing of rolls.

Another object is to provide complete control of the mechanism by conveniently arranged push buttons, so that a given sequence or schedule of roll spacings may be carried out, or any one or more of the settings in the schedule omitted or repeated, by the simple manipulation of these push buttons.

Another object is to provide, in connection with the automatic control apparatus, manually operated means so adapted that the control of the screw down motor may at any stage and at any time be taken away from the automatic control means and entirely and wholly controlled by the manual means.

Another object is to provide a control mechanism of this character in which the rolls may be accurately spaced according to a predetermined schedule of spacings, with provision for automatically "plugging" or "inching" the screw down motor should it drift beyond the point corresponding to the desired roll setting, thereby making possible automatic setting of the rolls within narrow predetermined limits.

A still further object is to provide a control mechanism of this character in which a plurality of independent schedules of roll spacings may be provided for, and means in connection therewith whereby it is possible to switch from one of these schedules to any other, or back and forth from one schedule to the other, at any time, by the operation of conveniently arranged push buttons, and without requiring an excessive interval of time or unreasonable effort on the part of an operator.

Yet a further object is to provide an automatic control mechanism of this character which will carry through a schedule of roll settings independently of the skill of an operator, thereby making possible the automatic treatment of a bloom or ingot according to a predetermined scientifically worked out schedule of passes.

Yet further and more specific objects will be apparent from the ensuing description, in which Fig. 1 is a schematic layout of a portion of the apparatus in one embodiment of our invention, showing its relation to a screw-down motor.

Fig. 3 is a fragmentary view of a portion of the apparatus employed in one embodiment of our invention and showing a different method of driving the control apparatus in accordance with operation of the screw down motor.

Figure 2:
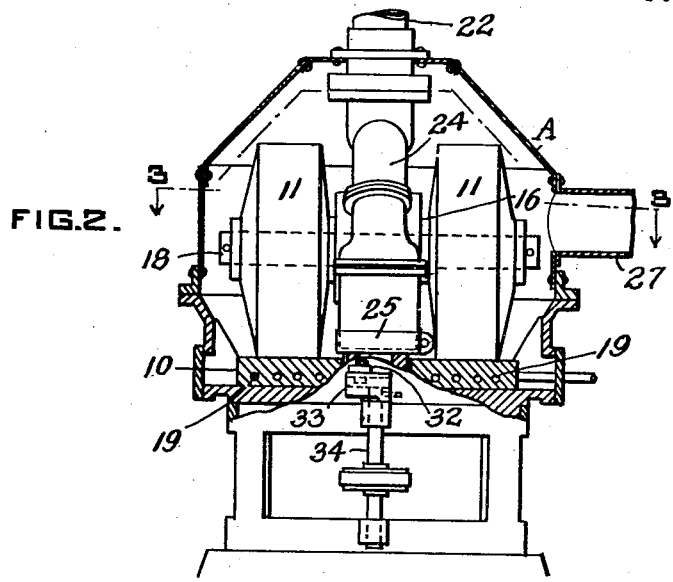
Fig. 2 is a simplified diagram of connections embodying this and other apparatus for controlling the screw-down motor.

Referring now to Fig. 1, there is shown a screw-down motor 10 suitably geared to relatively movable rolls 12 through gearing 14, the gearing being adapted to separate the rolls 12 by rotation of the screw-down motor 10. Also is shown a driven shaft 16 geared to the screw-down motor shaft 18, as by gears 17. The driven shaft 16 is shown as interrupted by an adjustable coupling 20, hereinafter more fully referred to. A pinion shaft 22 is suitably connected to the driven shaft 16 by gears 24, as shown. The pinion shaft 22 has integral therewith a pinion 26 meshing with a ring gear 28, which is associated with a differential 30 similar to that used in an automobile. Operably connected with the differential 30 are shafts 32 and 34. Rigidly secured to one end of the shaft 32 is an operating arm 84 (see Fig. 2) of a vernier rheostat 36. Rigid with the shaft 32, intermediate the differential 30 and the vernier rheostat 36, is a worm gear 38 meshing with a worm 40 on the shaft of a set-up motor 42.

Figure 4:
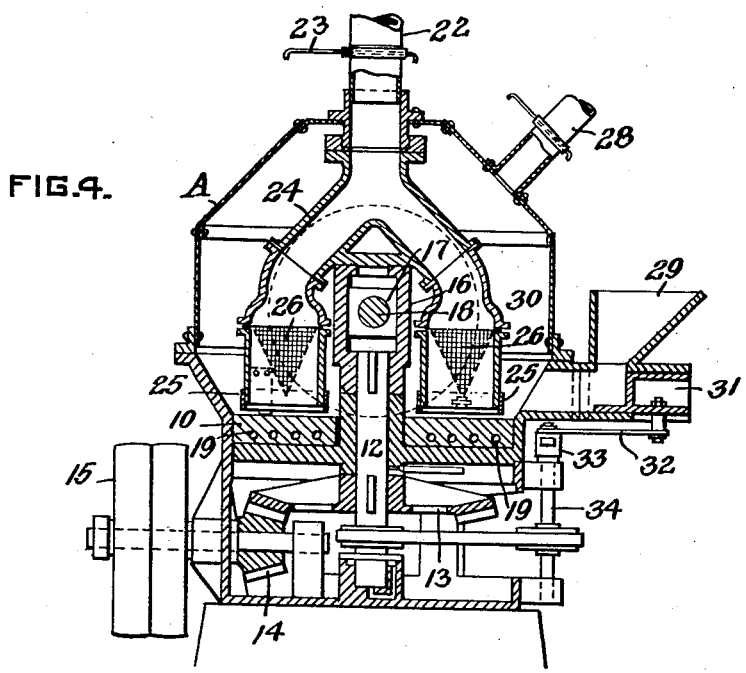
Fig. 4 is a fragmentary diagram of connections which we may employ in another embodiment of our invention.

Fixedly secured to the shaft 34 is an operating arm 102 (see Fig. 2) of a cut-out or directional control device 44, the details of which will more clearly hereinafter appear. Rigid with the shaft 34, intermediate the differential 30 and the cut-out device 44, is a worm 46 meshing with a worm gear 48 rigid with a shaft 50 secured to the operpreferably valve-controlled as at 23, said pipe having the end within the housing operatively connected to a rotating structure which is adapted to provide a twin supply thereto. This rotating structure, shown more particularly in Fig. 4, comprises an inverted Y-shaped member 24 mounted upon the upper end of box 16 and traveling therewith. As shown in Fig. 3, the branches of structure 24 are located between the crushing rolls 11, and as shown in Fig. 4, the lower ends of these branches project in proximity to the upper face of table 10, these ends being enlarged diametrically and each having an annular member 25, adjustable vertically, to vary the distance between the top of the table and the open end of the branch. As shown, the branches may be formed sectional if desired. Each branch may be provided with a suitable screen structure 26 spaced from its open end a suitable distance and adapted to limit the size of particles of material which may be carried forward through pipe 22, particles of larger size dropping away from the screen and returning to the upper surface of the table for further crushing action. A screen, however, is not necessary as the material may be graded by the rapidity of the flow of air through the apparatus.

As will be readily understood, the mechanism C provides an exhausting action with respect to pipe 22 and structure 24, thus tending to produce an indrawing effect at the lip or lower edge of the branches, or the members 25, which control the width of the space through which the air, etc., may enter into the chambers below the screens 26, the lip and these members 25 thus tending to regulate the pressure through pipe 22 by controlling the area of the annular inlet between these members and the table.

The air supplied to the interior of the casing is preferably heated, the heating device being provided for this purpose, this device, in the form shown in Fig. 1 as a radiator structure, receiving its heat from the exhaust gases from engine B. The heated air is delivered to the unit A by a suitable pipe 27. Consequently, the material being pulverized is not only subjected to the heating action provided by the table, but, in addition, to the heated air introduced through pipe 27 and which must pass over the surface of the table before it can pass into the branches of structure 24. Since this air forms the supply for the mechanism C, it will be understood that the drying action will be continued on the material as it is carried along through structure 24 and pipe 22.

If the material being prepared is of such character that it is desirable to separate the material and the air, as presently referred to, the separator may be connected with the housing of unit A so that the separated air may be returned to the housing a valve controlled pipe 28 (Figs. 1 and 4) forming a passageway for this purpose.

The material to be pulverized is introduced into the unit in suitable manner, Fig. 4 indicating a way in which this may be accomplished, 29 indicating a hopper, 30 a passageway leading into the interior of the unit below the hopper, and 31 a reciprocating member which is adapted to intermittently feed charges of material on to the top of the table where it is acted upon by the crushing rolls 11. The member 31 is shown as operated by a pitman 32 carried by an arm 33 formed on a member mounted on shaft 34, the latter being driven from shaft 12 by suitable belt connections.

As will be understood, rotation of shaft 12 causes planetary movement of the crushing rolls and of structure 24, the rolls also having an individual rotation on axle 18, due to friction. As the branches 24 have their inlet ends opposite the travel path of the rolls on the table, it will be readily understood that as this planetary movement takes place, the material crushed by the rolls will be brought into the sphere of influence of the branches of the structure 24 through the travel of this structure. Since there is a suction effect provided by the particular arrangement of the inlet ends of these branches, it will be clear that the crushed particles will be drawn upwardly within the branches and, if of a size which will pass through the mesh of the screens, will pass onwardly to mechanism C from where they will be passed to the desired point, dependent upon the character of the material and its use. For instance, if the material is coal, the mechanism C would be connected to deliver the contents of pipe 22 to a suitable separator (indicated at E) within which the pulverized coal would be separated from the air, as by gravity, thus leaving the pulverized coal substantially free from air while stored, this being of importance when coal is the material, since the presence of air therein would tend to produce a somewhat explosive mixture. The separating mechanism may be of any well known type.

Obviously, this arrangement not only provides an efficient crushing or pulverizing action, but greatly decreases the length of time required in moving the pulverized or pulverulent material from the crushing zone to the point of storage, this being possible by reason of the fact that the material is not required to be subjected to a preceding or succeeding drying action or extensive manipulation. The position of structure 24 and its travel movements bring it into operation in sequence or quick succession to the crushing action, thus removing the particles of material from the crushing zone and carrying them to the separating apparatus (if such be employed) with rapidity.

By employing screens 26 of different mesh, the fineness of the material can be readily controlled, the screen acting to grade the material, the particles which cannot pass through the screen dropping back onto the table within the path of planetary movement of the crushing rolls. Where the weight of the crushed particles is of more importance than the maximum dimensions, it is possible and preferable to omit screens and grade entirely by speed of the air current which is controlled by a valve in pipe 28 and by the speed of the exhauster.

By providing the relatively narrow channels, formed by the inlet end of a branch of structure 24 or the adjustable member 25 and the crushing plate 10, together with the enlarged interior space or chamber of the lower end of said branch, the air with the entrained material is caused to pass through said channel at a comparatively rapid speed, slowing down somewhat in the enlarged interior space. This construction is such as to not only affect all the material in the crushing zone over which the lower end of the branch passes by thoroughly stirring up the crushed material, but also acts to grade by gravity action the material carried by the air within the enlarged space of the branch, even before it reaches the screen, or, in case a screen is not employed, before it reaches the upper end of said enlarged chamber. As a result, the desired material is carried by the air into and through pipe 22, while that portion of the material of an undesirable size is rejected and falls back into the crushing zone to be again acted upon by the crushing rolls and further affected by the temperature of the heated plate 10.

What I claim is:—

1. In means for preparing pulverulent material and in combination, a pulverizing mechanism including crushing rolls and a table, means for withdrawing the pulverized material from the table by an exhausting action including a traveling open-end pipe element movable over the table.

2. In means for preparing pulverulent material and in combination, pulverizing mechanism including crushing rolls and a table with which said rolls coöperate, means for heating said table whereby the material will be subjected to concurrent pulverizing and drying action, and means for withdrawing the pulverized material from the table by an exhausting action including a traveling open-end pipe element movable over the table.

3. In means for preparing pulverulent material and in combination, pulverizing mechanism including crushing rolls and a table with which said rolls coöperate, means for heating said table whereby the material will be subjected to concurrent pulverizing and drying action, and means for withdrawing the pulverized material from the table by an exhausting action including a traveling open-end pipe element movable over the table, and means for delivering a preheated fluid carrier to the open-end pipe element.

4. In means for preparing pulverulent material and in combination, pulverizing mechanism, and means for withdrawing the pulverized material from the crushing zone of said mechanism, said means and mechanism having elements adapted to travel in unison.

5. In means for preparing pulverulent material and in combination, pulverizing mechanism, and means for withdrawing the pulverized material from the crushing zone of said mechanism, said means and mechanism having elements adapted to travel in unison and being positioned to act successively on the material being treated.

6. In means for preparing pulverulent material, pulverizing mechanism including a stationary table, means for heating said table to provide a drying action on the material, and means for withdrawing the pulverized treated material from the crushing zone, said mechanism and withdrawing means having elements movable in unison.

7. In means for preparing pulverulent material, pulverizing mechanism including a stationary table, means for heating said table to provide a drying action on the material, and means for withdrawing the pulverized treated material from the crushing zone, said mechanism and said withdrawing means having elements forming a unit movable in a planetary path and operating in sequence on the material within such path.

8. In means for preparing pulverulent material and in combination, pulverizing mechanism including a table, and means for withdrawing the pulverized material from the crushing zone of said mechanism, said means including an open-ended movable element having its open end substantially parallel with the top plane of the table, said means also including an exhauster.

9. In means for preparing pulverulent material and in combination, pulverizing mechanism including a stationary table, and means for withdrawing the pulverized material from the crushing zone of said mechanism, said means including an element having an open inlet-end opposite the top of the table and adapted to travel in a path parallel to the top plane of said table, the said open end being spaced a distance from the top of the table to provide a restricted passageway therebetween, said means also including an exhauster mechanism adapted to provide an indrawing action through said restricted passageway.

10. In means for preparing pulverulent material and in combination, pulverizing mechanism including a stationary table, and means for withdrawing the pulverized material from the crushing zone of said mechanism, said means including an element having an open inlet-end opposite the top of the table and adapted to travel in a path parallel to the top plane of said table, the said open end being spaced a distance from the top of the table to provide a restricted passageway therebetween, said means also including an exhauster mechanism adapted to provide an indrawing action through said restricted passageway, and means for adjusting the width of said passageway.

11. In means for preparing pulverulent material and in combination, pulverizing mechanism including a stationary table and crushing mechanism movable on said table to provide an annular crushing zone, and means for stirring the material within and withdrawing the pulverized material from said zone, said means including an open-end element spaced from said table and movable in a plane parallel to the top plane of the table, the space between the table and the open-end of said element forming an annular restricted passageway leading to the interior of the element and active throughout the width of the crushing zone, said means also including an exhauster mechanism adapted to provide an indrawing action through said passageway.

12. In means for preparing pulverulent material and in combination, pulverizing mechanism, a housing therefor, means for withdrawing the pulverized material from the crushing zone by an exhausting action including a traveling open end pipe element, for supplying heated air to said housing, said air forming a carrier for the pulverized material in the withdrawal action.

13. In means for preparing pulverulent material and in combination, mechanism for concurrently pulverizing and drying the material, separating mechanism, a fluid carrier for withdrawing the pulverulent material from the crushing zone of said pulverizing mechanism and delivering it to said separating mechanism, and means for delivering heated air to form a carrier for the pulverulent material, said separating mechanism separating the air and material.

14. In means for preparing pulverulent material and in combination, a stationary table, crushing rolls coöperating therewith for providing pulverizing action, a power device operatively connected to move said rolls, means supplied by said device and extending into said table to provide a circulation of a heating medium within the table, whereby concurrent pulverizing and drying action will be had, and means for creating and maintaining a preheated fluid carrier for withdrawing the pulverulent material from the crushing zone of the pulverizing mechanism.

15. In means for preparing pulverulent material and in combination, a stationary table, crushing rolls coöperating therewith for providing pulverizing action, a power device operatively connected to move said rolls, means supplied by said device and extending into said table to provide a circulation of a heating medium within the table, whereby concurrent pulverizing and drying action will be had, and means for withdrawing the pulverulent material from the crushing zone of the pulverizing mechanism including a traveling element having an open inlet end opposite the table and an exhauster, and means for supplying heated air to form a carrier for the pulverulent material during the withdrawal action.

16. In means for preparing pulverulent material and in combination, pulverizing mechanism including a table, and means for withdrawing the pulverized material from the crushing zone of said mechanism, said means including an element having an open inlet-end opposite the top of the table, said open end spaced a distance from the top of the table to provide a restricted passageway therebetween, the interior of said element adjacent the passageway being enlarged to provide a material-grading chamber, said means including an exhauster mechanism.

In testimony whereof, I affix my signature in presence of two witnesses.

WALTER O. AMSLER.

Witnesses:
S. A. McFarland,
W. G. Doolittle.